United States Patent [19]

Booker

[11] Patent Number: 5,085,836

[45] Date of Patent: Feb. 4, 1992

[54] PROCESS FOR DESILVERING SILVER HALIDE PROCESSING FLUIDS

[75] Inventor: Barbara T. Booker, Spartanburg, S.C.

[73] Assignee: E. I. du Pont de Nemours and Company, Wilmington, Del.

[21] Appl. No.: 620,890

[22] Filed: Dec. 3, 1990

[51] Int. Cl.$^5$ ............................................. C22D 11/04
[52] U.S. Cl. ..................................... 423/34; 423/36; 75/713; 75/634; 75/637; 75/735; 75/736; 210/719
[58] Field of Search ................. 75/713, 634, 637, 631, 75/635, 733, 736; 423/34, 36; 210/719

[56] References Cited

U.S. PATENT DOCUMENTS

| | | | |
|---|---|---|---|
| 1,448,475 | 3/1923 | Weisberg | 423/34 |
| 3,082,079 | 3/1963 | Bulloch et al. | 75/713 |
| 4,035,181 | 6/1977 | Fisch | 75/713 |

FOREIGN PATENT DOCUMENTS 4536205  6/1970  Japan.

*Primary Examiner*—Theodore Morris
*Assistant Examiner*—Edward Squillante

[57] ABSTRACT

A method to reduce dissolved silver present in spent, waste, photographic processing fluids containing thiosulfate, is described. This process involves adjusting the pH to a low level prior to the addition of finely ground steel to the solution. With the pH at the low level, e.g. 2.5, the reaction of dissolved silver to precipitated silver, is facilitated. However, the pH must then be raised or neutralized, e.g. 7-8.5, in order to insure that the dissolved silver is essentially all precipitated. This material can now be safely shipped without treatment as a hazardous material and, after filtering the solids therefrom, can be safely disposed.

6 Claims, No Drawings

PROCESS FOR DESILVERING SILVER HALIDE PROCESSING FLUIDS

BACKGROUND OF THE INVENTION

1. Field of the Invention

This invention relates to the field of processing of silver halide elements and specifically to processing fluids used therewith. Even more specifically, this invention relates to waste silver halide processing Hfluids and to the problem of waste disposal thereof.

2. Description of the Prior Art

Images formed on silver halide elements are conventionally processed by developing in fluids contained hydroquinone and other developing agents followed by so-called "fixing" the resulting image in aqueous sodium thiosulfate, for example. This last step removes all of the undeveloped silver halide and leaves the developed image areas, which are normally silver, on the element. It is conventional to process these films in automatic systems in which the developer and fixer are replenished from time to time to maintain their activity. Since the spent fixer and developer solutions have dissolved silver present, it is also conventional to recover the silver for recycle and there are a host of systems designed to accomplish this step.

After silver recovery, large amounts of aqueous wastes still remain and much of this has a small amount of dissolved silver present. Since dissolved silver is considered by some to be a hazardous waste, in many areas of the world, the user is not permitted to either ship this waste or to purge the waste into the sewers without first insuring that virtually no dissolved silver is present. Removal of these trace amounts of silver from this material is no easy task since there are so many ingredients present and these ingredients represent competing reactions which prevent silver removal. Thus, users require a large expenditure of time and money to accomplish this task.

SUMMARY OF THE INVENTION

Therefor, it is an object of this invention to provide a simple and inexpensive method to remove trace amounts of dissolved silver from silver halide waste processing fluids having thiosulfate contained therein.

These and yet other objects can be achieved by following a process which employs the following steps:

(a) reduce the pH of said fluid to the range of from 2.3 to 2.6;

(b) add sufficient powdered iron to reduce substantially all the trace, dissolved silver to silver solids (c) increase said pH to a range of from 7 to 8.5.

DETAILS OF THE INVENTION

Waste, silver halide processing fluids usually contain large amounts of dissolved silver and this must be recovered. Most of the recovery processes describe devices which employ base metals higher in the electromotive series than silver in order to effect an exchange of silver for some less expensive metal. These prior art devices usually employ some kind of container to contain this base metal and pass the waste fluids through this container in order to effect this exchange. After these systems are spent, the canisters are returned so that the silver can be finally recovered by a process of roasting. Considerable fluids are left. Some of this fluid comes from the canister or from waste fluid that has already passed through the canister. This material is generally referred to as "sump water" and most of this waste contains large amounts of thiosulfate and this material interferes with any further recovery of trace amounts of silver that remain. Thus, these fluids are still considered hazardous and cannot easily be disposed.

In the practice of my invention, sufficient acid to this sump water is added in order to reduce the pH of this material to about 2.3 to 2.6, with pH 2.5 being preferred. At this point, most of the thiosulfate is converted to sulfurous acid and cannot interfere with the further reduction of dissolved silver to solid silver. The addition of acid to accomplish this fact may require some time period if there is a large amount of sump water present. In any case, after this pH is achieved, enough powdered iron is added to insure that most of the dissolved silver present is reduced to solid silver. The pH is then adjusted to from 7 to 8.5 (prefer about 8.5) to precipitate soluble silver as silver sulfide when it is preferably filtered. This liquid can be further handled or shipped without problem.

Any waste, photographic processing solution containing small amounts of dissolved silver can be treated with my process and can be rendered suitable for discard or shipment with little or no environmental problems. These solutions include fixer/developer solutions as well as waste materials that have already been processed through standard, conventional silver recovery units including those units that depend on electrolytic and chemical replacement, for example. After silver recovery, some silver either remains in the fluid or silver will re-dissolve presenting the problems addressed by the metes and bounds of this invention. Usually, these levels of dissolved silver will be low, e.g., around 100 to 1200 ppm. However, environmental regulations in a number of areas of the world prevent this amount of silver from being discarded or shipped without treating the solution as hazardous waste. By using the process described herein, these levels can be reduced to a range from 0.001 to 5 ppm, for example.

When it is desired to de-silver the waste, silver halide processing fluid containing thiosulfate, e.g., sump water, must first be treated to lower the pH to ca. 2.3 to 2.6. The beginning pH of the waste stream can vary widely with a typical pH range being in a range from 5 to 8. The pH lowering can be accomplished by the addition of sufficient acid, e.g., sulfuric acid. Care must be taken to insure that this acid be added slowly enough not to cause problems of foaming or boiling and to insure that the thiosulfate be destroyed. It is postulated that thiosulfate is oxidized to sulfurous acid and reduced to elemental sulfur and that when powdered iron is added, this material can be solubilized. This results in precipitation of silver in the form of silver or silver sulfide.

In a particularly preferred process, sulfuric acid is added to waste sump water over a period of 10 to 12 hours, for example. Time is important at this step when large amounts of fluid are to be treated in this manner. For example with 1,000 to 5,000 gallons, the time to circulate acid through the system to adjust this pH will be within this time frame. The pH of this material is lowered to ca. 2.5 by this process. At that point, finely ground steel wool, e.g., around 1–5 mm in particle size, is added and the solution is stirred and recirculated to insure proper mixing with this solid. After this step, the pH will be around 3.0 and is then adjusted to ca. 8.5 with sodium hydroxide, for example. This solution must then be filtered to remove solids. At this point, the silver level will be less than 1 ppm and the solution will be safe for shipment or discard. In comparison, simply adding sufficient powdered iron or steel wool will not reduce the level of dissolved silver significantly.

This invention will now be illustrated by the following examples. All parts and percentages are by weight unless otherwise indicated.

EXAMPLE 1

In this example, waste, photographic processing fluids taken from silver recovery canisters using the iron for silver replacement system, was used. An accumulation of this fluid amounting to about 3,000 gallons was tested and found to have ca. 80 ppm dissolved silver still present. Since most of this material came from waste fixer, considerable thiosulfate was also present. Sulfuric acid was added slowly over a period of time of about 10 hours and a pH of 2.5 was achieved. At this point, the dissolved silver was measured and found to be 20–100 ppm. Then, about 20 pounds of iron wool that had been ground in a Wiley #5 Mill (Thomas Scientific, Swedesboro, N.J. 08085-0099) and screened to 2.0 mm, was added and the sump water was recirculated with a pump for about 2 hours to insure contact with the powdered steel. The silver level at this point was 40–100 ppm. Then, the pH of this material was adjusted to 7.0 using NaOH. At this point, the silver level was less than 1 ppm indicating that this material was within EPA guidelines for shipment as a non-hazardous waste. All of the precipitated solids were recovered by filtering and then the were safely disposed without environmental problems.

EXAMPLE 2

In this particular example, about 1,200 gallons of sump water obtained from a source similar to that described in Example 1 (spent silver recovery canisters), was placed in a cone bottom tank. 12 gallons of 25% sulfuric acid was added over a period of 24–36 hours to achieve a pH of 2.5. Then, 5 pounds of finely ground steel wool (see Example 1), were added and the sump water stirred thoroughly. Then, this material was permitted to stand for 4–8 hours. At this point, 7 gallons of 20% NaOH were added and the pH raised to 8.5. The dissolved silver level was measured and found to be 0.023 ppm and was safe for shipment or discard. The solids were recovered using a filter to dispose of the fluid safely.

What is claimed is:

1. A method to remove trace amounts of dissolved silver from a silver halide waste processing fluid having thiosulfate contained therein comprising the following steps:
    (a) adding sufficient acid to reduce the pH of said fluid to a range of from 2.3 to 2.6;
    (b) adding sufficient powdered iron to reduce substantially all the trace, dissolved silver to silver solids;
    (c) increasing said pH to a range of from 7 to 8.5.

2. The method of claim 1 wherein by addition of sulfuric acid said pH of step (a) is lowered to 2.5 and wherein the solution is allowed to equilibrate for at least 5 hours prior.

3. The method of claim 1 wherein said pH of step (c) is increased using sodium hydroxide.

4. The method of claim 1 wherein said powdered iron is obtained from steel wool ground to a particle size of from 1 to 5 mm.

5. The method of claim 1 wherein after the pH is adjusted from 7 to 8.5 solids are filtered therefrom.

6. The method of claim 1 wherein after step (c) the amount of dissolved silver is not greater than 5 ppm.

* * * * *